Nov. 15, 1966  K. RÄNTSCH ETAL  3,285,123
SCALE READING APPARATUS
Filed Nov. 30, 1962  4 Sheets-Sheet 1
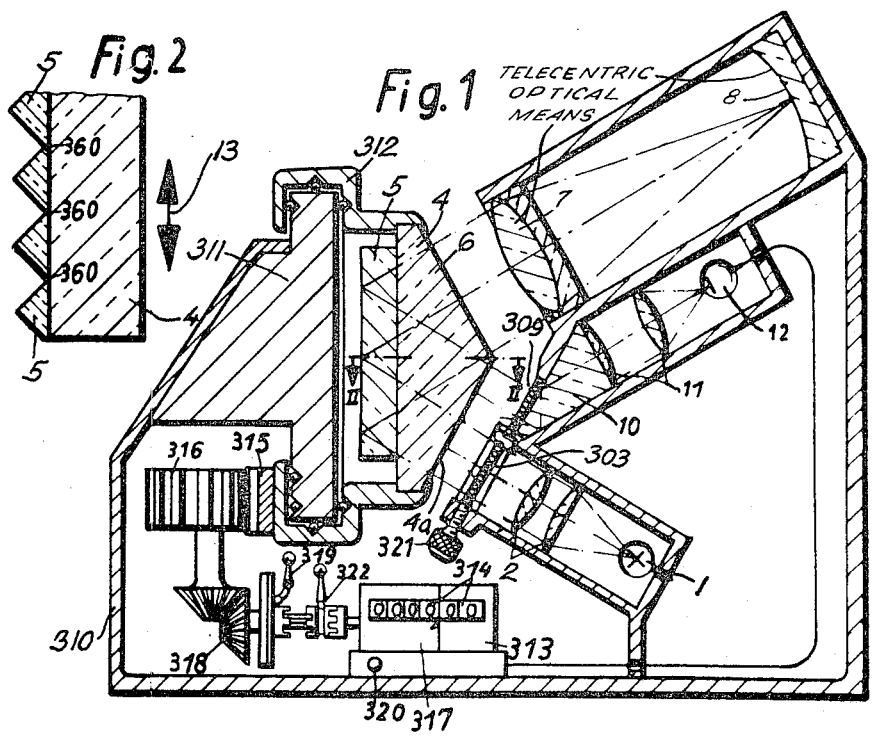
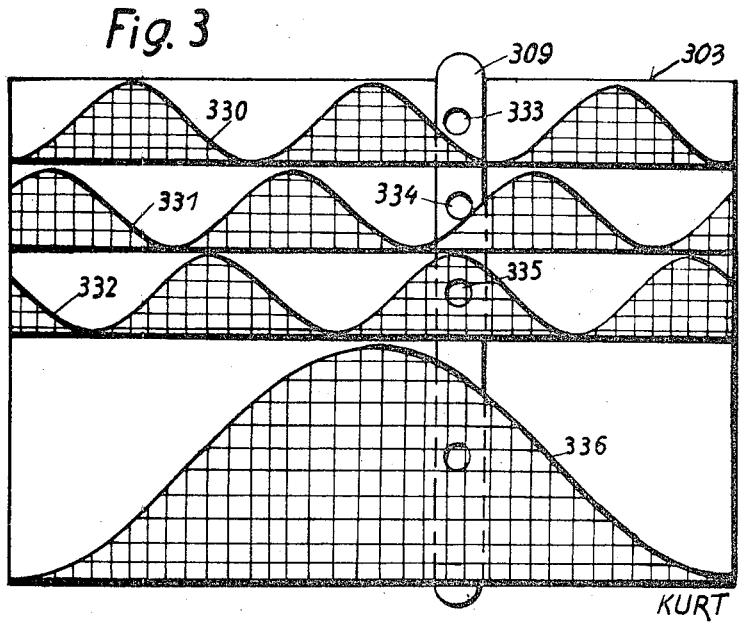
INVENTORS
KURT RÄNTSCH
ADOLF WEYRAUCH
BY Toulmin & Toulmin
ATTORNEYS

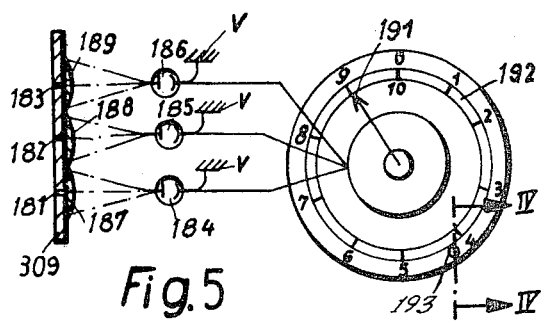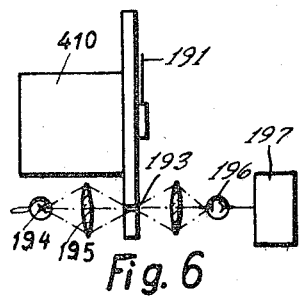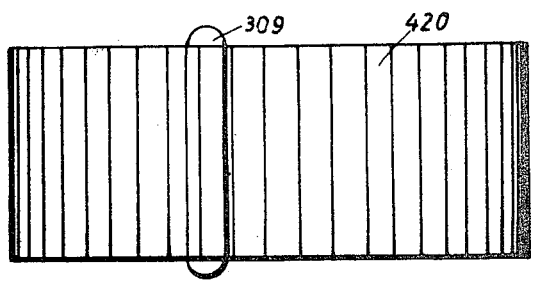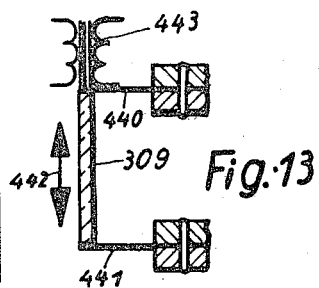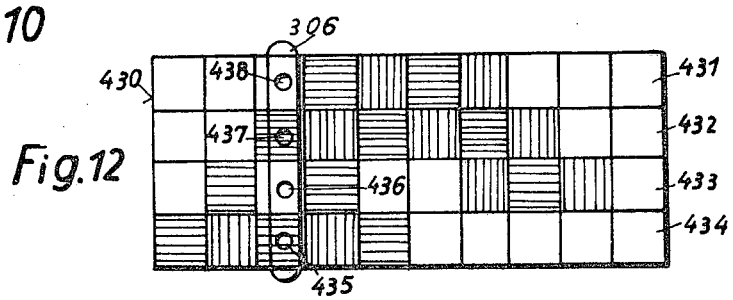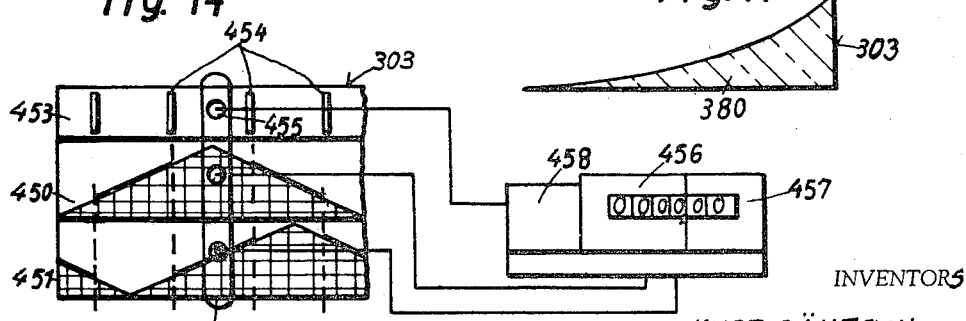

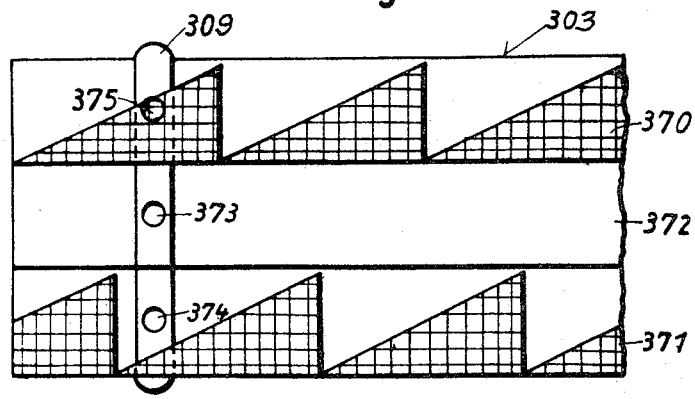
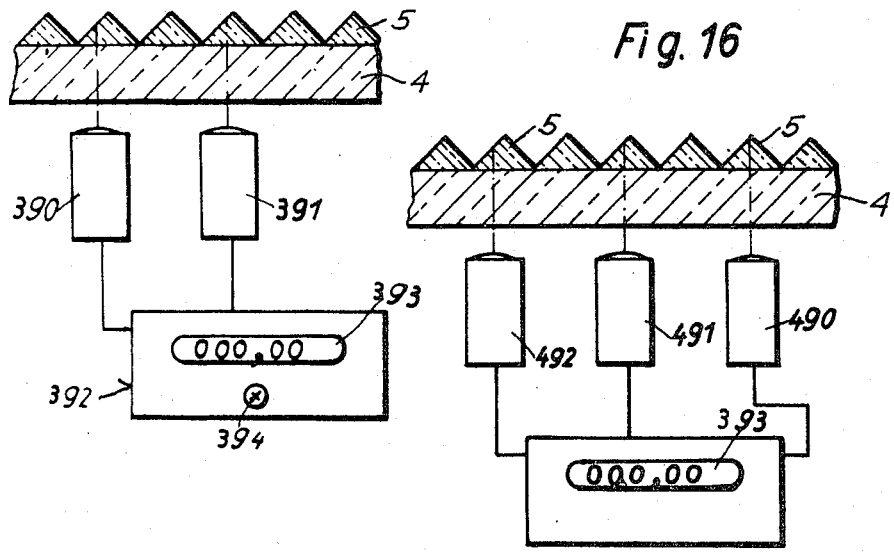

United States Patent Office 3,285,123
Patented Nov. 15, 1966

3,285,123
SCALE READING APPARATUS
Kurt Räntsch and Adolf Weyrauch, Wetzlar (Lahn), Germany, assignors to M. Hensoldt & Sohne, Optische Werke AG, Wetzlar (Lahn), Germany
Filed Nov. 30, 1962, Ser. No. 241,425
Claims priority, application Germany, Dec. 4, 1961, H 44,311; Sept. 22, 1962, H 46,987
21 Claims. (Cl. 88—14)

The present invention relates to the detection, measuring and indication of the relative displacement between two elements, one of which is to carry a novel scale while the other element carries a novel reading device for the scale.

For the purpose of describing and claiming the invention, the element with the scale will be called displaceable, whereas the components pertaining to the reading device, or most components thereof, will be considered as being stationary. It is understood, however, that this is for the purpose of convenience only and refers merely to the relative positional relationship between the various parts. No change is required to practice the invention with the scale stationary relative to the reader, and the reading device being displaceable, since this arrangement is only an inversion.

It is known in the art to optically and/or photoelectrically scan a scale for reading whereby the accuracy of reading depends on how finely the scale has been divided.

Reading devices are known to visually bridge the gap between the images of two scale strokes, so as to interpolate the interval between the two strokes thereby enabling the scale reader to read finer values as directly ascertainable from the divided scale itself. Such a device is not suitable for photoelectric reading, since one usually has to "zero in" the scale. While this is possible by means of photoelectric means with follow-up control, the cost of equipment is usually large. It is the object of the present invention to provide for a scale reading device in which the accuracy of reading does not depend on how finely the scale is divided, but where a graticule is used to bridge the scale division intervals to permit easy photoelectric reading without automatic zeroing in.

The object of the invention is attained by means of a novel scale cooperating with a novel reading device for such scale.

The basic elements employed are a displaceable scale member constituted by at least one plurality of parallel mirror surfaces, equidistantly spaced apart along and inclined to the direction of scale displacement. Preferably, similar shaped prisms are employed, mounted on a scale body or being linked together otherwise to constitute a uniform structure. There is also provided a first stationary graticule comprising a transparent plate having opaque areas and a stationary image producing means reproducing a light pattern from the first graticule upon a second graticule. The light path for producing the graticule light pattern includes a mirror surface or surfaces of the scale member as defined above. The first graticule is orientated to produce light modulations in the direction of scale displacement as well as to the direction of light pattern movement occurring when said scale member is displaced as stated. The second graticule comprises one or more slots or gaps extending perpendicularly to the direction of the said light pattern movement.

There is further provided a means for ascertaining the coarse value of scale displacement either by detecting the periodic passage of complete graticule light patterns, or light patterns of groups of graticule strokes, contrasting areas etc., by an additional scale position detecting device, or by duplication of the aforementioned scale reading device with one device having a more coarsely divided graticule while the graticule of the other reading device is finely divided.

If the graticule image is sensed by photoelectric detector means at the second graticule (target graticule), the output can be used in the digital or in the analog mode. In the former, the graticule is shaped so that the passage of the graticule image or light pattern produces a train of pulses. In case one operates in the analog mode, the graticule is not a mere succession of lines, but areas of gradual transition between transparency and opaqueness.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

FIG. 1 illustrates a cross-sectional view through a first embodiment of the invention;

FIG. 2 is a sectional elevation along line II—II of FIG. 1 taken through a scale member;

FIG. 3 illustrates the main graticule and target graticule which can be employed in any of the aforementioned embodiments to obtain an analog output signal;

FIG. 5 illustrates schematically an electric circuit network for evaluating the optical output produced by the graticules illustrated in FIG. 4;

FIG. 6 illustrates schematically a view along line IV—IV of FIG. 5;

FIG. 9 illustrates a simplified graticule arrangement for producing a linearly varying output;

FIG. 10 illustrates a graticule arrangement with gradually increasing opaqueness, i.e. decreasing transparency over a uniformly shaped area;

FIG. 11 illustrates a cross-section through a gray wedge which can be employed as a graticule in the embodiment of the invention;

FIG. 12 illustrates a graticule arrangement for producing a binary coded, digital output;

FIG. 13 illustrates schematically an improvement for the positioning of the target graticule employed in the above-described embodiment;

FIG. 14 illustrates a graticule arrangement which produces a fine, analog as well as a coarse, digital output; and FIGS. 15 and 16 illustrate schematically other modes of obtaining fine and coarse scale reading values.

Figure 4:
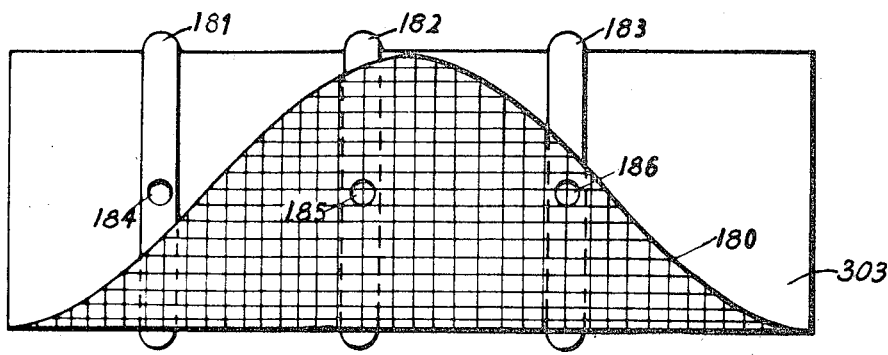
FIG. 4 illustrates a modified graticule arrangement also for producing an analog output.

Turning first to FIGS. 1 and 2, there is shown a light source 1 disposed in a suitable housing 310 together with a condenser 2 for illuminating an optical graticule 303. The lines or areas representing the grating of the graticule are orientated to modulate the intensity of the light passing through the graticule in a direction perpendicular to the axis of condenser 2 and to the plane of the drawing. Light from graticule 303 enters a glass plate 4 through a surface 4a which is parallel to the plane of extension of graticule 303, both planes extending perpendicular to the plane of the drawing of FIG. 1.

Glass plate 4 supports a plurality of similar, equidistantly spaced rectangular prisms 5 (see FIG. 2) defining a scale member. The prisms reflect the light entering through surface 4a towards exit surface 6 of plate 4 and into a stationary telecentric imaging optical means 7, 8, supported in an upper portion of housing 310. Reflection occurs by a total reflection from the inclined surfaces of prisms 5. There usually will be effective one prism for such reflection, though this is not mandatory. The imaging optical means comprises a collector lens 7 having at its focal point a concave mirror 8. Optical elements 7 and 8 produce an image at the ratio 1:1 so that the rays are directed anew onto prisms 5, and a light pattern from graticule 303 is produced on an intercepting, target graticule or optical means 309.

The plane of graticule 309 (including the image thereon of graticule 303) is reproduced on a photoelectric receiver 12 by means of a prism 10 and lenses 11. The ray path is readily discernible from FIG. 1 and it can be seen that a surface of prism 10 serves as reflector towards another surface thereof to direct the light towards lenses 11.

Glass plate 4 can be shifted in directions perpendicular to the plane of the drawing of FIG. 1 as indicated by double arrow 13 of FIG. 2. Upon shifting plate 4 in these directions, the image of stationary graticule 303 travels across target graticule 309 and the photoelectric receiver registers light pulses which are fed to counter 313.

Graticules 303 and 309 can also be described as graticule means, wherein a portion of the graticule means is imaged upon another portion thereof.

The double reflection at prisms 5 causes the traveling speed of the image of graticule 303 to be four-fold the speed of plate 4. Thus, if graticules 303 and 309 have similar grating constants, with adjacent marker or grating lines having a distance of $4\mu$, the photoelectric receiver 12 and the electric detector circuit such as a counter 313 connected thereto detect shifting distances of plate 4 at the order of magnitude of $1\mu$. In other words, with a grating constant of $4\mu$, the photoelectric receiver 12 will register one pulse, when scale member 4, 5 is shifted by $1\mu$.

The arrangements as described thus far can be used to count pulses. For example, upon movement of the subscale, the light modulations detected by the photoelectric detectors employed are counted in counting device 313.

It is, furthermore, possible to employ non-uniformly grated graticules, wherein the graticules have different grating constants with individual optical photoelectric systems associated with the different gratings. Examples of this type will be described later in this specification. One can also employ a graticule with groups of periodically repeated gratings. In this case the distance from center to center between adjacent prisms must be an integral plurality of all the different gratings and/or of the length as between periodical groups or gratings.

Furthermore, it is possible to use a graticule which is not simply provided with equally spaced division strokes, but to employ a graticule with a complex, coded grating, for example, a binary coded grating. Coding defines only one complete group of gratings, strokes, etc., and when the scale member has shifted by a distance corresponding to the passage of the image of the said complete group, the photoelectric receivers will indicate again similar values. Thus, one has to provide for additional electronic equipment registering the number of passages of complete grating groups. In this case the distance from center to center of adjacent prisms must again be an integral plurality of the largest grating distance of the encoded primary graticule.

In order to obtain coarse measuring values two principles can be employed. One can use an additional graticule track producing a train of pulses indicative of the passage of a complete cycle of fine measuring pulse intervals or periods or groups of division strokes, etc. Alternatively, one can use a rack and pinion device linking the scale body to a mechanical or electrical counter.

FIG. 1, furthermore, shows in the common housing 310 provided for the various optical elements a stationary guiding piece 311 directly secured to housing 310 and supporting a slide carriage 312 to which is secured the scale plate 4 with prisms 5. Of course, the carriage 312 moves perpendicularly to the plane of the drawing.

There is a rack 315 secured to carriage 312 meshing a pinion 316 for driving a counter 317. The counter 317 is adjusted so as to count the number of passages of the image of a group of gratings of graticule 303 mentioned above.

Pinion 316 does not drive counter 317 directly but there is interposed a gear 318 and a coupling 319. This coupling 319 can be opened so as to interrupt the driving connection between pinion 316 and counter 317. After such an interruption has been, a button 320 may be operated manually to reset the counter to zero so that counting can be started anew from an arbitrarily selectable position of carriage 312 with scale 4, 5. There is, furthermore, provided a coupling 322 permitting reversal of the sense of rotation as between pinion 316 and counter 317. Accordingly, it is possible to count forward as well as backward movement of carriage 312.

The photoelectric receiver 12 is connected to fraction indicator 313 indicating, for example, one-tenth and one-hundredth of a millimeter. The counter may be equipped with electronic digit indicators. In order to erase any indication visible in counter 313 the graticule 309 can be shifted perpendicularly to the optical axes of the condenser system 2 by means of a screw 321. Between two neighboring prisms 5 on the scale body, there is a marginal area 360 effecting the light reflected at the prisms. This weakening detrimentally influences the measuring operation. How this can be avoided will be described later with reference to FIGS. 8 and 9. One can provide a first objective between graticules 303 and glass plate 4 imaging the graticule 303 directly upon the apex edge 5a of a prism 5. The telecentric optical means 7 and 8 is disposed so that the image of graticule 303 on prism edge 5a is reproduced again on this apex edge, but laterally displaced from the first image. A second objective (not shown) is interposed between plate 4 and graticule 309 imaging the last-mentioned image on apex edge 5a onto graticule 309.

The advantage of this particular arrangement is that the prisms 5 do not require very accurately machined angles respectively between two inclined surfaces.

In the following, there will be described graticules to be employed as main or imaging graticules 303 in FIG. 1. In each case, the graticule body is constituted by a plate provided with opaque and transparent areas. These areas when imaged upon the target graticule result in a detectable light intensity at the target graticule indicative in the analog mode of the fine value of scale member position. It will further be described how the coarse value of the position of the scale member can be derived at the analog or digital mode from the fine value scanner itself.

Proceeding now to FIG. 3 there is shown a first example of a graticule 303 shown in superimposed relationship to a single gap target graticule 309. One can also construe this figure as showing target graticule 309 with the superimposed image of graticule 303. Graticule 303 is actually composed of four sections or tracks. There are three sinusoidal curves 330, 331 and 332 phase shifted by 120°. The curves appear as boundaries between an opaque or light absorbing and a transparent section or sections of the transparent graticule plate body. When the scale member moves (312, 4, 5 in FIG. 1), the images of the sinusoidally shaped opaque areas will run over the gap 309 in horizontal direction (as shown).

One can see that the photoelectric receiver section in FIG. 1 is actually shown in a simplified manner, and that preferably there are provided three photoelectric receivers 333, 334, 335 arranged along the length of the gap 309 in the plane of the drawing and being respectively responsive to the images of the curves 330, 331 and 332. There will be a corresponding number of optical means in lieu of the single optical system 11 in FIG. 1 or a common cylinder optical means. Upon passage of the images, the alternating light intensities in the three photoelectric receivers are correspondingly sinusoidal and phase shifted by 120°. The purpose of the triple track is the following:

In order to provide for an analog output, at the target graticule the output to be produced in the associated photoelectric receivers is to be a voltage, the magnitude of which yields information as to the fine value of the position of the scale. Therefore, more than one sinusoidal voltage is to be employed because one will employ only that portion of each voltage wherein the rate of change is sufficiently large upon passage of the graticule image thereof. This is the reason why three sinusoidal voltages are employed which are phase shifted by 120°, and only that voltage portion of each is being used having momentarily the largest rate of change. Accordingly, there will be a periodic switch-over from one photoelectric receiver to the next in order to always have the largest rate of change available for utilization, and only that output signal of any of the three photoelectric receivers exhibiting the strongest rate of change indicates the shift and exact position of scale member 4, 5. In the particular position shown in FIG. 3 of graticule 303 relative to gap 309, the photoelectric receiver 334 appears to sense the largest rate of change and, therefore, is momentarily controlling. This is a first example of the analog mode.

There is a fourth sinusoidal curve 336 defining a complete period for graticule 303. This illustrates how one can derive signals of different periodicy from a single graticule plate. This curve 336 enables exact assignment of the periodically repeated signals in the three photoelectric receivers to a complete millimeter interval. The photoelectric receiver scanning curve 336 can operate upon the coarse pulse counter 317, and this is then a substitute for the rack and pinion arrangement 315, 316 of FIG. 1 for coarse value detection.

Proceeding now to FIG. 4 there is shown another graticule 303 having but one sinusoidal curve 180, but target graticule 309 is defined by three parallel gaps 181, 182 and 183, and there are three photoelectric receivers 184, 185 and 186 aligned in a direction corresponding to the direction of the movement of the image of curve 180. The distance between the three photoelectric receivers is such that again the light intensities respectively received are phase shifted by 120°. The output of the photoelectric receivers in FIG. 4 does, in fact, the same as the output of the three sinusoidal curves in FIG. 3.

FIG. 5 illustrates a top view of the graticule 309 of the type shown in FIG. 4 using gaps 181, 182 and 183. It can be seen that each gap cooperates with a cylindrical lens which three lenses are designated by reference numerals 187, 188 and 189, each lens images the light entering its associated gap onto one of photoelectric receivers 184, 185, 186, respectively. The three photoelectric receivers are electrically connected to an electric indicator having, for example, a three phase driving system supplied by the three phase shifted sinusoidal voltages derived from receivers 184, 185, 186. The driving system drives a rotatable pointer 191 cooperating with a stationary scale 192. The pointer 191 rotates in unison with a diaphragm having hole 193 which hole is positioned at 180° to the extension of pointer 191.

From FIGS. 5 and 6 it can be seen that there is provided also a lamp 194, and condenser lens 195 images the filament of lamp 194 onto the hole 193 when pointer 191 has a position slightly before the zero of indicating scale 192. The light permitted to pass through hole 193 is collected and directed into a photocell 196. There is a counter or indicator 197 electrically connected to photocell 196. Upon rotation of pointer 191 and the diaphragm with hole 193, a train of light pulses is produced to be counted by counter 197. This can be used so as to produce the coarse value or to call on a storage device for successively drawing the respective next digit therefrom for coarse value indication. It is quite possible to provide the arrangement in such a manner that counting is possible by rotation of 191 and 193 in either direction.

Assuming, the coarse scale value is determined by way of any digital method, for example, with the rack-pinion-counter arrangement of FIG. 1, while the fine scale value is determined by way of an analog method (with a graticule such as shown in FIG. 4 or as shown in FIG. 3 but without the fourth track at 336) one has to avoid uncertainty of the measuring result occurring when the change over of 9 to 0 in the highest decimal of the fine measuring device does not occur exactly simultaneously with the jump from one digit to the next in the lowest decimal of the coarse value indicator. If the coarse value is determined analog (with a graticule such as shown in FIG. 5 or 4 with equipment shown in FIGS. 5 and 6) the aforementioned difficulty will not arise since in this case indication is obtained by way of pointers having intermediate positions, and thus one can recognize which gradation of coarse value is indicated by the "zero" or "nine" momentarily registered by the fine value indicator. (See scale of FIG. 5.)

In accordance with a modification of the device of FIG. 1 it is, therefore, suggested to feed the coarse value derived from a rack and pinion (315, 316) arrangement as rotary movement directly upon a pointer (suitable gear being provided for) such as 191 in FIGS. 5 and 6 so that the pointer, in fact, indicates the lowest digit of the coarse value.

In the following embodiments of the invention, (FIG. 7 et seq.) graticules will be described producing linear increasing and/or decreasing output voltages at the photoelectric detectors observing the target graticule. In view of the periodical mode of scanning, there will, of course, be scanning points where there is a change from increasing to decreasing output voltage and this produces an uncertain result around such point (reversion point). If, however, one uses two or more staggeredly positioned graticule tracks producing output voltages with the reversion points of one track falling in range of steady voltage change as produced by the other graticule track, one has always available a graticule portion with the steady change of the output it produces.

Figure 7:
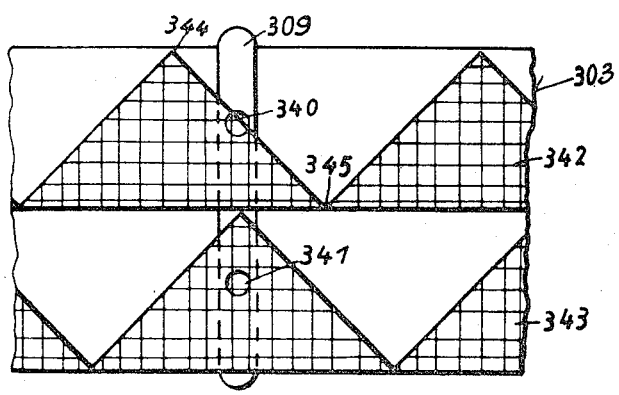
FIG. 7 illustrates a graticule arrangement used in the invention embodiment for producing a linearly varying, analog output.

FIG. 7 illustrates such a type of graticule plate 303 different from those previously described. In FIG. 7 there is shown two tracks each having saw-tooth shaped opaque areas (342, 343) defining a curve linearly alternating the intensities of light intended to pass through the transparent sections. The target graticule 309 is again a single slot or gap, and there are two photoelectric receivers 340 and 341 scanning the intensities of the two images of the saw-tooth shaped image graticule. The curves 342 and 343 are phase shifted by 90° so as to bridge the reversion points 344 and 345 of curve 342. Thus, one will alternatingly employ the outputs of receivers 340 and 341. How this can be carried out in a simple manner while concurrently providing for coarse value measurement will be best understood with reference to FIG. 14.

Turning now to FIG. 14 there is shown another main graticule 303 having three tracks 450, 451 and 453 having areas of an opaque-transparent distribution as was illustrated in FIG. 7. However, the third track 453 is opaque with slots 454 thus defining a simple line graticule to be scanned by a corresponding photoelectric receiver 455. Upon passage of the image of each slot 454, photoelectric receiver 455 switches over from one photoelectric receiver to the other, respectively observing tracks 450 and 451. This can be carried out by simply having receiver 455 operating upon a flip-flop alternatingly activating and deactivating gates for the other receivers. Receiver 455 furthermore is connected to a counter 456 for counting the periods of passage of the tracks 450 and 451. The displacement value of the scale member is photoelectrically sensed by the displacement of the images of tracks 450 and 451, and is fed to a fine value registering device 457. The counter 456 is also provided with a storage device 458 causing the respectively succeeding digit in the counter to light up only when called upon by the fine counter 457.

As was mentioned above in connection with the description of FIG. 1, there are border zones between adjacent prisms 5 designated in FIG. 1 by reference numeral 360 and producing a momentarily decreasing light intensity in the image of graticule 303 when shifted in direction of double arrow 13. This decrease in light intensity can only be balanced, but the gap serving as a target graticule has a, comparatively speaking, large width which is by itself disadvantageous because it reduces sensitivity.

To avoid this disadvantage there will be described embodiments using at least two parallel tracks as graticules with one photocell scanning the image of each track. Each track comprises a series of opaque and transparent areas which are so shaped that the quotient of the photocell voltages of two tracks is a function of image track displacement. The target graticule is constituted by a gap wide enough, so that the said light weakening at zone 360 does not influence materially the said quotient. In other words, the large gap width causes the quotients of the voltages as defined above to be practically insensitive to the passage of border zone 360.

Figure 8:
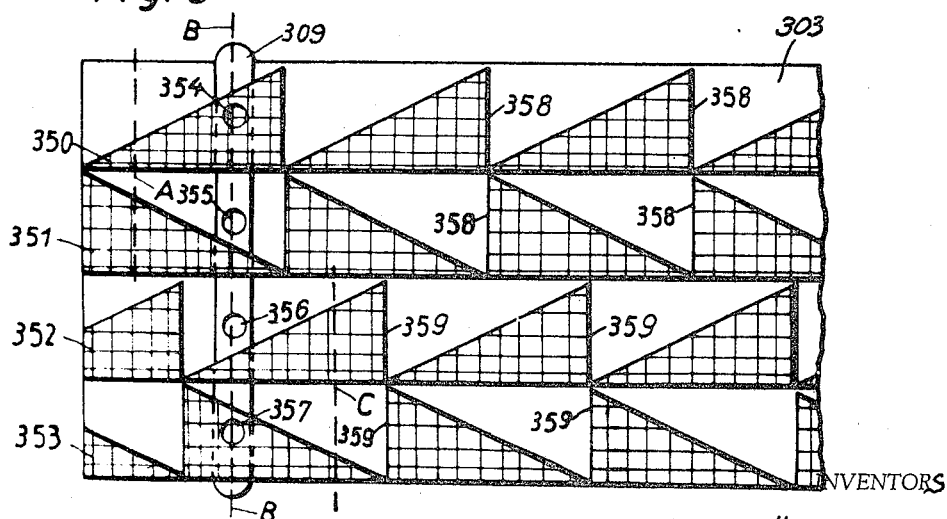
FIG. 8 illustrates a four-track graticule for producing an analog output.

In FIG. 8 there is shown a graticule defining four tracks being composed of saw-tooth shaped opaque areas 350, 351, 352, 353, respectively. Areas 350 and 351 have coinciding steep sides or flanks 358, while tracks 352 and 353 have coinciding sides or flanks 359. Tracks 350 and 352 have similar orientation but they are phase shifted by 180° whereas tracks 351 and 353 are oppositely orientated to the aforesaid tracks and there is also a phase shift 180° among tracks 351 and 353.

The particular distribution of transparency and opaqueness of, for example, tracks 350 and 351 produce light intensities along track 350, for example, to decrease at the same rate as the intensities increase at track 351. When a steep flank 358 is reached, both tracks produce changeovers in opposite direction.

There are four photoelectric receivers associated respectively to the four tracks. These photoelectric receivers are schematically indicated at 354, 355, 356 and 357, and they are disposed adjacent target graticule 309 which is constituted in this example again as a single gap or slot. Thus, upon movement of the image of graticule 303 across gap 309 there are produced four linearly varying voltages in the four photocells.

A conventional circuit network produces the quotient of the voltages of photoelectric receivers 354 and 355, and another network produces the quotient of the voltages at photoelectric receivers 356 and 357.

Furthermore, by appropriate and conventional gating means photoelectric receivers 354 and 355 are enabled for measuring in the range A–B only, whereas in the range B–C measuring is carried out by photoelectric receivers 356 and 357 only.

This is for the following reason: The flanks 358 and 359 produce a certain error when the image of the graticule 303 passes across gap 309 because this gap is of relatively large size for overbridging the zones 360 of the scale member as aforesaid. Accordingly, the light intensity as sensed by the individual photoelectric receivers will not alter rapidly upon passage of one of the steep flanks 358 and 359, but it is a steady change of light intensity. In order to avoid this at A, B and C a switch over is carried out as mentioned above in general so that only photocells 354 and 355 are effective in the range A–B and photocells 356 and 357 are effective only in range B–C. It is apparent that with such an arrangement the passage of the steep flanks across the photocells do not produce any miscounting.

In this embodiment the target graticule 309 can be wide enough for bridging the prism borders or zones 360, and the steep flanks of the tracks on graticule 303 do not influence the measuring result, since only steady portions of the respective tracks are observed while graticule portions having steep area flanks will be rendered ineffective in the sensing circuit, and sensing is carried out by that pair of photocells only momentarily scanning the image of a steadily changing opaque-transparent portion of the graticule 303.

FIG. 9 illustrates a further example for overbridging or balancing the effect of zones 360 of the scale member. There is shown a graticule 303 having only two tracks 370 and 371 and each track is defined by a series of saw-tooth shaped opaque areas, the areas in the two tracks are displaced or phase shifted relative to each other by 180°. Between the two tracks there is a center track 372 which is completely transparent. If photoelectric receiver 373 senses the image of such track, it thus produces a constant output affected only by the passage of zones 360. There are two additional photoelectric receivers 374 and 375, respectively scanning the image of tracks 371 and 370, and they are connected in circuit so that there is a quotient of the voltages produced by receivers 375 and 373, and another quotient is formed from the output voltages of receivers 374 and 373. There are, furthermore, provided circuit means switching from one track to another whenever a steep flank approaches graticule gap 309 with the switching occurring towards the track not having momentarily a steep flank adjacent or approaching its photoelectric receiver.

The principle of employing a twin-track graticule for overbridging zones 360 of the scale member can be used in case of linearly varying opaque and transparent areas as well as in case of a sinusoidally shaped boundary between opaque and transparent areas.

FIG. 10 illustrates a modified graticule 303 not having discrete division strokes or areas with definite boundaries but zones of variable degrees of transparency. The transparency varies in the direction of graticule image movement so that the photoelectric receiver observing the target graticule gap senses a correspondingly modulated or modified light intensity. A corresponding design is illustrated in FIG. 11. Here the image graticule is constituted by a gray wedge 380. Upon moving of the scale body member the image of the gray distribution travels across the target graticule 309 and photocell registers a gradually changing light intensity for producing an analog output.

It will be appreciated, that coarse measuring values can be derived as was explained above in connection with FIGS. 1, 3, 4, 5 and 6.

FIG. 12 shows a main graticule 430 which is binary coded. There are four tracks 431, 432, 433, 434, each including bright and dark square shaped areas. The target graticule 309 being also a single gap running across the images of these four tracks and the four photocells 435 through 438 observe light when confronted with the image of transparent area, and they do not receive light when observing the image of an opaque area. Thus, the output of the receivers is strictly "on" or "off." The photoelectric receivers are connected in circuit so that digit indicator tubes indicate a particular displacement path depending upon the position of the gap 309 to the image of graticule plate 430. The graticule shown in FIG. 12 is thus capable of indicating ten units of a decimal position. In order to produce higher decimals, a rack and pinion arrangement as disclosed and described with reference to FIG. 1 can be used.

FIG. 13 illustrates a further modified arrangement. The target graticule 309 is movably disposed by means of two leaf-springs 440 and 441 so as to enable the target graticule 309 to move in either direction of double arrow 442, which is perpendicular to the general ray path traversing the graticule. There is provided an electromagnet 443 causing target graticule 309 to vibrate in the said direction so that the corresponding traveling of the image of graticule 303, and a corresponding phase shift can be detected in a suitable circuit network, and the specific displacement path of the scale member can be computed therefrom.

Pulse counting devices have generally the disadvantage that disturbing pulses appearing from other sources are duly counted thus introducing errors. A photocell, for example, can go dead, which introduces a series of errors.

In the following there is disclosed how this disadvantage can be overcome. According to the embodiment of FIG. 15, there are shown two reading devices operating with different principles of measurement. One has graticules for ascertaining an analog value, the other has graticules for ascertaining digital values. The scale member itself is, of course, the same. Each reading device is basically as is illustrated in FIG. 1.

The scale carrier body 4 with prisms 5 is scanned by two scale reading devices 390 and 391 operating in accordance with such different principles. Device 390, for example, produces a digital output whereas device 391 produces an analog output. The outputs of the two scanners 390 and 391 are individually fed to a device 392 including a series of digit indicator tubes 393 and also including an error signal indicator 394 lighting up whenever the outputs of reading devices 390 and 391 do not agree. This, of course, results in a controlling of the measuring results. The coarse value can be attained by any of the abovedescribed methods.

If the travel path of a scale body is one lengthy one, it is of advantage to provide for a plural stage measuring system. This can be carried out in using several systems as disclosed in FIG. 1, but wherein the graticules are grated differently. The grating constants of the graticules in the several reading devices, for example, have a decimal ratio. This is illustrated in FIG. 16.

In FIG. 16 there is shown a three-stage measuring device wherein the prisms 5 are called upon by three reading devices 490, 491 and 492. These reading devices can operate here in the analog mode or the digital mode.

Of course, an analog-digital converter can be used for connecting the analog-output producing photoelectric receivers to a digital indicator.

These reading devices include simple line or division stroke graticules and the respective main or image and target graticules have gratings related to each other at the ratio of 1:10:100. Scanner 490, for example, is responsive to the values of a one-hundredth of a millimeter, reading device 491 senses one-tenth of a millimeter, and reading device 492 senses the millimeter of scale body displacement. The various values are indicated at counter 393.

The invention is not limited to the embodiments described above but all changes and modifications thereof not constituting departments from the spirit and scope of the invention are intended to be covered by the following claims.

What is claimed is:

1. In an apparatus for the measurement of the displacement of an object displaceable in a predetermined direction, a scale on said displaceable object and having a series of intersecting reflecting surfaces with the lines of intersection arranged normally to said direction with successive reflecting surfaces being at right angles to each other, a transparent plate having an opaque area thereon varying periodically parallel to said direction of displacement, optical means comprising a gap positioned perpendicularly to said direction of displacement, a first optical system including a light source and light collimating means and passing a collimated beam of light through said transparent plate to project a light pattern from said transparent plate onto one of said reflecting surfaces and then onto an adjoining reflecting surface, a second optical system including collector lens and a curved reflecting surface receiving the light pattern of said transparent plate reflected from said adjoining reflecting surface to reflect said light pattern back onto said scale reflecting surfaces and onto said optical means, the reflected light pattern of said transparent plate moving across the gap of said optical means in a direction coinciding with the direction of displacement of said object so that the amount of light received by said gap varies as a function of said displacement, and photoelectric receiver means positioned adjacent to said gap for receiving the light pattern of said transparent plate traveling across said gap during the displacement of the object to detect the displacement of the object.

2. In an apparatus as set forth in claim 1, said area having a sinusoidal boundary.

3. In an apparatus as set forth in claim 1, said area having a saw-tooth shaped boundary.

4. In an apparatus as set forth in claim 1, said plate having a plurality of similar shaped opaque areas.

5. In an apparatus as set forth in claim 4, said areas being arranged to define at least two tracks with the areas of one track being phase shifted to those of the other track.

6. In an apparatus as set forth in claim 5, said areas having sinusoidal boundaries and being arranged in three tracks with the sinusoidal boundaries of the three tracks being phase shifted by 120°.

7. In an apparatus as set forth in claim 1, said plate having a first plurality of similar shaped areas arranged in a track so that the light patterns thereof as observed exhibit periodically varying brightness upon displacement of said scale; said plate having at least one further area arranged thereon in a second track.

8. In an apparatus as set forth in claim 1, said plate having a variable degree of transparency.

9. In an apparatus as set forth in claim 1, with said transparent plate including at least two pluralities of opaque areas arranged along said direction, each plurality including similar shaped opaque areas so as to define a periodic track, there being a phase-shift between the areas of said two tracks.

10. In an apparatus as set forth in claim 1, with said transparent plate including at least two tracks along said direction, each track including similar shaped, opaque, periodically repeated areas, the length of period being different in said two tracks.

11. In an apparatus as set forth in claim 1, with said receiver means including means for deriving coarse and fine displacement values from said light pattern.

12. In an apparatus as set forth in claim 1, with said area forming a triangle.

13. In an apparatus as claimed in claim 4 wherein all of said areas are similar in shape and arranged to define four tracks, each area having a first side perpendicular to said direction and a second side inclined to said direction, the first sides of two of said tracks registering with each other, the first sides of the other two tracks registering with each other but not with the first sides of said first two tracks, the second sides of said first two tracks being inclined opposite to each other and the second sides of said other two tracks being inclined opposite to each other.

14. In an apparatus as claimed in claim 4 wherein said opaque areas so vary in shape that the light pattern brightness observed through said gap varies upon displacement of said scale, and further comprising means for deriving a fine measuring scale value from said photoelectric receiver means, and means for deriving a coarse measuring scale value from said photoelectric receiver means.

15. In an apparatus as claimed in claim 1 wherein said plate further comprises division strokes, said area so varying in shape that the light pattern brightness observable through said gap varies upon displacement of said scale, said photoelectric receiver means further producing an analog output responsive to said observed varying light pattern brightness, and photoelectric receiver means for observing the light pattern of said division strokes through said gap and producing a digital output responsive to said strokes.

16. In an apparatus as claimed in claim 1 and further comprising means operatively connected to said scale for deriving a coarse value of displacement from said scale with the smallest derivable coarse value corresponding to the passage of one periodically repeatable transparent plate light pattern past said gap.

17. In an apparatus as claimed in claim 16 wherein said coarse value deriving means includes a rack connected with said scale and extending along said direction of displacement; a pinion meshing with said rack; and a coarse value counter geared to said rack.

18. In an apparatus as claimed in claim 17 and further comprising coupling means between said pinion and said counter.

19. In an apparatus as claimed in claim 1 and further comprising means for adjusting said transparent plate and gap relative to each other in the direction of light pattern movement occurring when said scale is being displaced; and a counter connected to and driven by the output of said photoelectric receiver means.

20. In an apparatus as claimed in claim 14 and further comprising counter means connected to and driven by said photoelectric receiver means to measure said coarse value.

21. In an apparatus as claimed in claim 1 wherein said plate has a plurality of opaque areas, and a digital output signal produced in said receiver means by the images of said areas.

References Cited by the Examiner

UNITED STATES PATENTS

| | | | |
|---|---|---|---|
| 1,985,044 | 12/1934 | Lyle | 250—237 X |
| 2,451,465 | 10/1948 | Barney | 250—237 X |
| 2,880,512 | 4/1959 | Fenemore et al. | 88—14 X |
| 3,125,624 | 3/1964 | Illig et al. | 88—14 |

FOREIGN PATENTS

| | | |
|---|---|---|
| 782,831 | 9/1957 | Great Britain. |
| 118,539 | 1959 | Russia. |

JEWELL H. PEDERSEN, *Primary Examiner.*

RONALD L. WIBERT, *Examiner.*

E. S. BAUER, *Assistant Examiner.*